United States Patent
Wang et al.

(10) Patent No.: US 9,548,934 B2
(45) Date of Patent: Jan. 17, 2017

(54) DATA STREAM AND DATA PACKET TRANSMISSION METHOD AND DEVICE

(71) Applicant: ZTE Corporation, Shenzhen, Guangdong (CN)

(72) Inventors: Feng Wang, Shenzhen (CN); Jinqing Yu, Shenzhen (CN); Xiaobo Kuang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/647,235

(22) PCT Filed: Sep. 25, 2013

(86) PCT No.: PCT/CN2013/084207
§ 371 (c)(1),
(2) Date: May 26, 2015

(87) PCT Pub. No.: WO2014/079270
PCT Pub. Date: May 30, 2014

(65) Prior Publication Data
US 2015/0295837 A1    Oct. 15, 2015

(30) Foreign Application Priority Data

Nov. 26, 2012 (CN) .......................... 2012 1 0487311

(51) Int. Cl.
*H04L 12/28* (2006.01)
*H04L 12/851* (2013.01)
(Continued)

(52) U.S. Cl.
CPC ........... *H04L 47/2441* (2013.01); *H04L 47/10* (2013.01); *H04L 67/322* (2013.01); *H04L 69/00* (2013.01); *H04W 24/10* (2013.01)

(58) Field of Classification Search
None
See application file for complete search history.

(56) References Cited

U.S. PATENT DOCUMENTS 6,856,628 B1    2/2005    Bychowsky
7,464,180 B1 *  12/2008   Jacobs ................ H04L 47/2441
                                                    370/395.42

(Continued)

FOREIGN PATENT DOCUMENTS

CN          1968198 A      5/2007
CN        101043382 A      9/2007

(Continued)

OTHER PUBLICATIONS

Supplementary European Search Report in European application No. 13857575.8, mailed on Oct. 22, 2015.

(Continued)

*Primary Examiner* — Zewdu A Beyen
(74) *Attorney, Agent, or Firm* — Oppedahl Patent Law Firm LLC

(57) ABSTRACT

A data stream and data packet transmission method and device are described, relating to the field of interface data transmission technologies. The method includes: a home end detects whether data to be transmitted is a data stream or a data packet; when it is detected that the data stream and the data packet exist simultaneously, the data stream is preferentially transmitted; and upon completion of transmission of the data stream, then the data packet is transmitted. According to the embodiments of the disclosure, when the data stream and the data packet exist simultaneously, high efficiency transmission of the data stream may be achieved with no need of extra external time for scheduling opera- (Continued)

tions, effectiveness of transmission of the data stream is enhanced, and data transmission efficiency through the interface is improved.

11 Claims, 2 Drawing Sheets

(51) Int. Cl.
*H04L 29/08* (2006.01)
*H04L 29/06* (2006.01)
*H04L 12/801* (2013.01)
*H04W 24/10* (2009.01)

(56) References Cited

U.S. PATENT DOCUMENTS

| | | |
|---|---|---|
| 2004/0042456 A1 | 3/2004 | Dittmann |
| 2006/0245451 A1 | 11/2006 | Wakid |
| 2009/0122699 A1 | 5/2009 | Alperovitch |
| 2009/0129344 A1* | 5/2009 | Yousef .............. H04H 20/33 370/336 |
| 2009/0288125 A1* | 11/2009 | Morioka .............. H04N 7/1675 725/110 |
| 2012/0011252 A1 | 1/2012 | Alperovitch |

FOREIGN PATENT DOCUMENTS

| | | |
|---|---|---|
| EP | 1718027 A1 | 11/2006 |
| JP | 8204724 A | 8/1996 |
| JP | 2003143222 A | 5/2003 |

OTHER PUBLICATIONS

International Search Report in international application No. PCT/CN2013/084207, mailed on Jan. 2, 2014.
English Translation of the Written Opinion of the International Search Authority in international application No. PCT/CN2013/084207, mailed on Jan. 2, 2014.

* cited by examiner

DATA STREAM AND DATA PACKET
TRANSMISSION METHOD AND DEVICE

TECHNICAL FIELD

The disclosure relates to the field of interface data transmission technologies, and particularly to a data stream and data packet transmission method and device.

BACKGROUND

With the continuous development of technologies, users impose higher and higher requirements on high rate and high bandwidth, which has higher and higher requirements on stability and effectiveness of end-to-end data transmission. There are generally two manners for transmitting data. One is transmitting data in the form of data stream, i.e., constantly transmitting data to an opposite end in a timing manner. Even if no valid data exist, invalid data is constantly transmitted. To be specific, data is transmitted in the timing manner and the data may not be interrupted or stopped. The other one is transmitting data in the form of data packet, i.e., not transmitting data in the timing manner but transmitting data if available, wherein such transmission is not subject to timing.

Under most circumstances, in end-to-end interface-based data transmission, it is common that a data packet and a data stream need to be simultaneously transmitted through one interface. Particularly in the communications field, uplink or downlink real-time IQ data is transmitted in the form of data stream, and other control signals are transmitted in the form of data packet. If the data stream and the data packet, as two types of data, are transmitted through one interface, high reliability is needed for simultaneous transmission, which causes a great challenge to the interface designer.

SUMMARY

Embodiments of the disclosure are intended to provide a data stream and data packet transmission method and device, which are mainly applied in simultaneous transmission of a data stream and a data packet in an end-to-end interface, and can better solve the problem that data transmission efficiency is low and data transmission stability is poor.

An embodiment of the disclosure provides a data stream and data packet transmission method, which includes:
detecting whether data to be transmitted is a data stream or a data packet;
when it is detected that the data stream and the data packet exist simultaneously, preferentially transmitting the data stream; and
upon completion of transmission of the data stream, then transmitting the data packet.

Preferably, the method may further include: establishing, by sending a control character for establishing an interface link connection to an opposite end, the interface link connection with the opposite end.

Preferably, the method may further include: packetizing the data stream or the data packet, inserting a control character for identifying a data transmission type, and sending the packetized data stream or data packet to an opposite end.

Preferably, the method may further include: when it is determined that the data stream to be transmitted exists during transmission of the data packet, interrupting transmission of the current data packet, preferentially transmitting the data stream, and restoring transmission of the data packet upon completion of transmission of the data stream.

Preferably, the method may further include: inserting a control character identifying interruption of transmission of the data packet in the data packet whose transmission is interrupted, such that the opposite end restores transmission of the data packet.

Preferably, the method may further include:
receiving data from the opposite end; and
identifying, according to the control character in the data from the opposite end, the transmission type of the received data, and parsing out the data stream or the data packet.

An embodiment of the disclosure further provides a data stream and data packet transmission device, which includes:
a transmission type detecting module, configured to detect whether data to be transmitted is a data stream or a data packet; and
a conflict transmission processing module, configured: when it is detected that the data stream and the data packet exist simultaneously, to preferentially transmit the data stream; and upon completion of transmission of the data stream, to transmit the data packet.

Preferably, the device may further include:
a link establishing and restoring module, configured to establish, by sending a control character for establishing an interface link connection to an opposite end, the interface link connection with the opposite end.

Preferably, the device may further include:
a data packetizing module, configured to packetize the data stream or the data packet, and to insert a control character for identifying a data transmission type.

Preferably, the device may further include:
a receiving module, configured to receive data from an opposite end; and
a packet parsing module, configured to identity, according to the control character in the data from the opposite end, the transmission type of the received data, and to parse out the data stream or the data packet.

As compared with the related art, the embodiments of the disclosure achieve the following beneficial effects:
According to the embodiments of the disclosure, the data stream and the data packet are separately packetized, it is determined according to information of the packet header, whether the packet is a data stream or a data packet. When it is detected that a data stream and a data packet exist simultaneously, the data stream is preferentially transmitted, and upon completion of transmission of the data stream, the data packet is transmitted. This ensures that low latency and high stability of transmission of the data stream.

Further, according to the embodiments of the disclosure, real-time transmission of the data stream is implemented by interrupting transmission of the data packet in the data stream. Upon completion of transmission of the data stream, transmission of the data packet is restored. This implements high efficiency transmission of the data stream, and meanwhile improves throughput of data transmission on the entire interface.

DETAILED DESCRIPTION

Preferred embodiments of the disclosure are further described with reference to the drawings. However, it should be understood that the preferred embodiments described hereinafter are merely used for illustrating and explaining the technical solutions of the disclosure, but are not intended to limit the protection scope of the disclosure.

Figure 1:
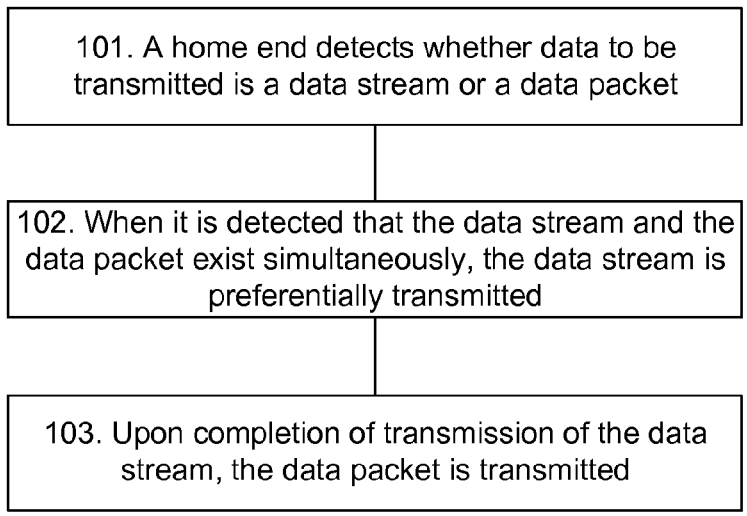
FIG. 1 is a schematic flowchart of a data stream and data packet transmission method according to an embodiment of the disclosure.

FIG. 1 is a schematic flowchart of a data stream and data packet transmission method according to an embodiment of the disclosure. As shown in FIG. 1, the method includes the following steps.

Step 101: It is detected whether data to be transmitted is a data stream or a data packet.

Herein, a home end establishes, by sending a control character for establishing an interface link connection to an opposite end, the interface link connection with the opposite end. After the link is established between the two ends, the home end respectively packetizes the data stream and the data packet, and meanwhile determines, according to the control character, whether the packetized data is the data stream or the data packet. To be specific, the form in which the data is packetized is determined according to the control character for transmitting data, such that various information of a receiving end is correctly parsed according to the control character of the packetized data. When the data stream and/or the data packet need to be transmitted through one interface, firstly a transmission type of the data is detected, that is, whether the data stream or the data packet, or both the data stream and the data packet.

Step 102: When it is detected that the data stream and the data packet exist simultaneously, the data stream is preferentially transmitted.

Herein, when the data stream and the data packet need to be simultaneously transmitted through one interface, the data stream is preferentially transmitted, and upon completion of transmission of the data stream, the data packet is transmitted.

In the transmission of the data packet, if a data stream is to be transmitted, transmission of the current data packet may be interrupted and the control character indicating interruption of transmission of the data packet is inserted in the data packet whose transmission is interrupted, and then the data stream is preferentially transmitted. Upon completion of transmission of the data stream, transmission of the interrupted data packet is restored.

Step 103: Upon completion of transmission of the data stream, data of another transmission type is transmitted.

Herein, the home end may also receive data from the opposite end, identifies a transmission type of received data according to the control character contained therein, and parses out a data stream or a data packet.

The embodiments of the disclosure are applied in a scenario of interconnection between components. The implemented transmission mechanism of the data stream and the data packet is intended to achieve data exchange between data from these two sources via a conflict and interruption manner. Since the data stream requires high real-time performance, the embodiments of the disclosure are further described with reference to FIG. 2 to FIG. 4.

Figure 2:
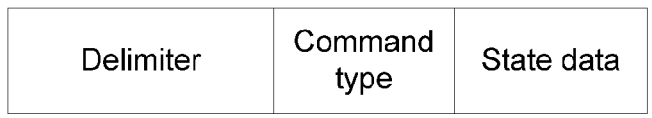
FIG. 2 is a schematic structural diagram of a control character according to an embodiment of the disclosure.

FIG. 2 is a schematic structural diagram of a control character according to an embodiment of the disclosure. As shown in FIG. 2, the control character includes a delimiter, a command type, and state data.

The delimiter is a special symbol, for example, a K code subjected to 8B/10B coding and is a signal different from data. By identifying the delimiter, the command type and the function of the state data may be acquired. That is, the delimiter is configured to distinguish whether the data is the control character or data.

The command type may serve as an indication of a link locking state, and indicate states of the home end such as a link unlocked state, a link locking state, and a link metastable state and the like. That is, the command type is configured to indicate a current link state.

The state data may indicate such functions as a type of transmitted data, a packet header of the data, a packet tail of the data, whether the data is interrupted or not and the like. The type of the transmitted data includes the data packet and the data stream. That is, the state data indicates such information as a packet type of the transmitted data and whether the data packet is interrupted.

The home end sends the control character to enable, via the delimiter, the opposite end to quickly judge received data of the receiving end, determine a state of the opposite end, and finally determine whether data can be correctly received between the two ends (herein referred to as locking, i.e., whether it is locked). In addition, the home end informs, via some characters in the command type, the opposite end of the current link state of the home end, i.e., whether the home end is locked.

The functions of the control character further include: indicating whether the transmission is start of next data transmission or end of previous data transmission.

Further, the control character may further include other control signals in the data stream. For example, if the data stream is uplink or downlink antenna data in a communication system, a frame frequency and a frame number may be simultaneously transmitted with the antenna data. In this case, the frame frequency and the frame number may be packetized in the control character for transmission.

Upon receiving the packetized data, the receiving end identifies whether the data is the data stream or the data packet via the control character, and finally parses out the data.

Figure 3:
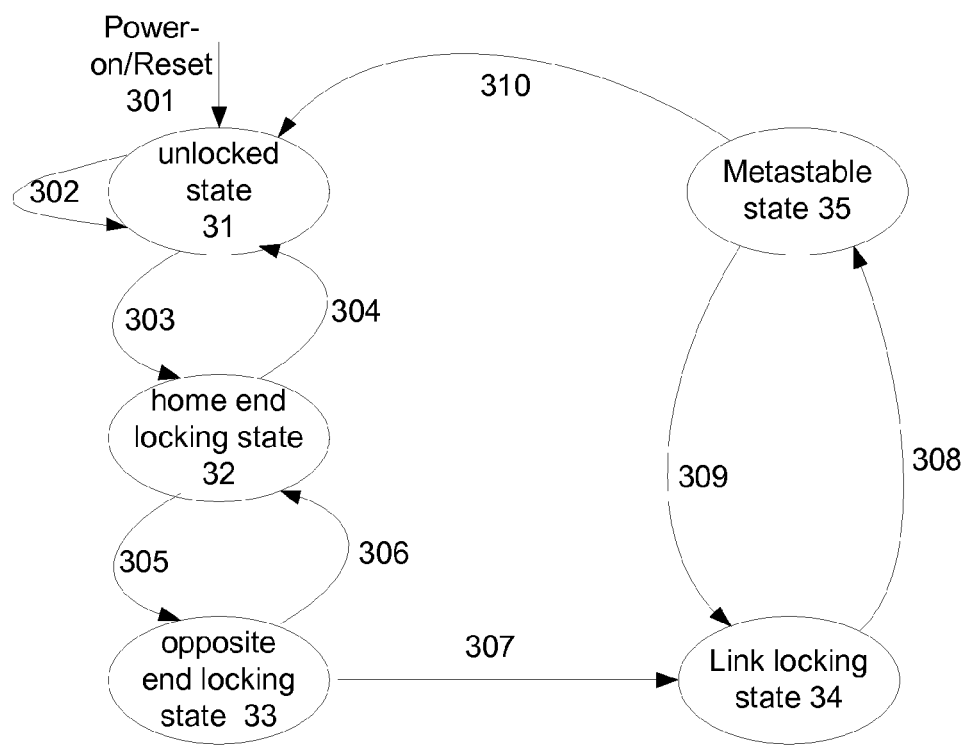
FIG. 3 is a schematic diagram of implementation of establishment of an interface link locking and reestablishment upon an unlocked state according to an embodiment of the disclosure.

Upon power-on or resetting of the system, the control character for establishing an interface link connection is sent such that an interface link between the two ends is established. After the link between the two ends is locked, in case of the link unlocked state, an embodiment of the disclosure further provides a manner of restoring locking. FIG. 3 is a schematic diagram of implementation of establishment of an interface link locking and reestablishment upon an unlocked state according to an embodiment of the disclosure. As shown in FIG. 3, a link establishment process totally includes five states, respectively an unlocked state 31, a home end locking state 32, an opposite end locking state 33, a locking state 34, and a metastable state 35.

The unlocked state 31: After being powered on, the system enters the unlocked state; in this state, it is indicated that a home end link and an opposite end link are both in the unlocked state, and wait to be locked; in this state, a control character for establishing an interface link connection is constantly sent to a data channel. If the home end is locked, the system enters a home end locking state; otherwise, the system continues waiting.

The home end locking state 32: In this state, the control character for establishing the interface link connection is continuously sent to the data channel; in this case, the number of control characters is configured to notify a signal indicating that the home end is locked to the opposite end. If a signal indicating that the opposite end is locked, the system enters the opposite end locking state; if it is detected that the home end link is subjected to the unlocked state, the system enters to the unlocked state again; otherwise, the system continues waiting.

The opposite end locking state 33: In this state, if it is captured that the locking state of the home end and the opposite end constantly reaches a threshold, the system jumps to the locking state; if it is detected that the opposite end is subjected to the unlocked state, the system enters the home end locking state; otherwise, the system continues waiting.

The link locking state 34: In this state, the link may normally receive and transmit data. In this case, if it is detected that the home end link is not stable and the control character sent from the opposite end indicates that the opposite end link is not stable or the received data is subjected to an error; the state machine jumps to the metastable state.

The metastable state 35: In this state, if it is still detected that the home end link is not stable and the control character sent from the opposite end indicates that the opposite end link is not stable or the received data subjected to an error, the state machine jumps to the unlocked state; otherwise, if the system waits for a specific clock period but no such error is detected, the system jumps to the locking state.

As shown in FIG. 3, the process of establishing the interface link connection by the system includes the following steps.

Step 301: After the system is powered on or reset, the home end enters an unlocked state; the system detects whether the home end link is locked; if not, step 302 is performed; otherwise, step 303 is performed.

Step 302: When determining that the home end link is not locked, the system still stays in the unlocked state and waits for being locked, and notify the opposite end that the home end link is not locked by sending a control character.

Step 303: When determining that the home end link is locked, the system enters the home end locking state, and notifies the opposite end that the home end is locked by sending the control character; upon entering the home end locking state, the system detects whether the home end link is normal; if not, step 304 is performed; otherwise, step 305 is performed.

Step 304: When determining that the home end link is not locked, the system still stays in the unlocked state.

Step 305: Upon entering the home end locking state, the system determines whether the opposite end is in a locking state; that is, determining whether the opposite end link is locked via judgment according to the data sent from the opposite end; if the opposite end is locked, the system enters the opposite end locking state; in this case, it is considered that the links of the two ends are both locked; upon entering the opposite end locking state, the system continuously detects whether the opposite end link is locked; if not, step 306 is performed; otherwise, step 307 is performed.

Step 306: When determining that the opposite end link is not locked, the system enters the home end locking state.

Step 307: When determining that the home end link and the opposite end link are both locked, the system enters the link locking state, and may normally receive and transmit data, and meanwhile may detect the locking states of the home end link and the opposite end link; if detecting that the locking state of the home end is released, or detecting that the opposite end data is subjected to an error or the locking state of the opposite end is released, step 308 is performed.

Step 308: The system enters the metastable state; in this case, the link can still be configured to normally receive and transmit data, and the system continuously detects the states of the two ends; the metastable state is a state in which data transmission is not stable, and the data transmission may be subjected to an error, which, however, is tolerable; in this state, when the system detects that the data transmission is stable, step 309 is performed; if in this state, the system still detects link unlocked state or data error of the opposite end, step 310 is performed.

Step 309: The system enters the link locking state.

Step 310: The system enters an initial state, i.e., the unlocked state; in the unlocked state, the system may automatically detects the state of the interface between the two ends, and establish the interface link connection again by using step 302 to step 309.

In step 307 to step 310, upon establishment of the link, if the system detects that the home end link is not stable, and the control character sent from the opposite end indicates that the opposite end is not stable or the received data is subjected to an error, the system may enter the metastable state. In the metastable state, the system still stays in the same state as the locking state, and continues sending data. However, if in this case it is detected that the home end link is not stable and the control character sent from the opposite end indicates that the opposite end is not stable or the received data is subjected to an error, the system enters the unlocked state. In the unlocked state, the system may automatically detect the state of the interface between the two ends, detect whether the home end and the opposite end are locked by repeating the above steps, and enter the locking state. Upon the unlocked state, the system may send an alarm signal to a higher layer, indicating that the link is subjected to the unlocked state.

Figure 4:
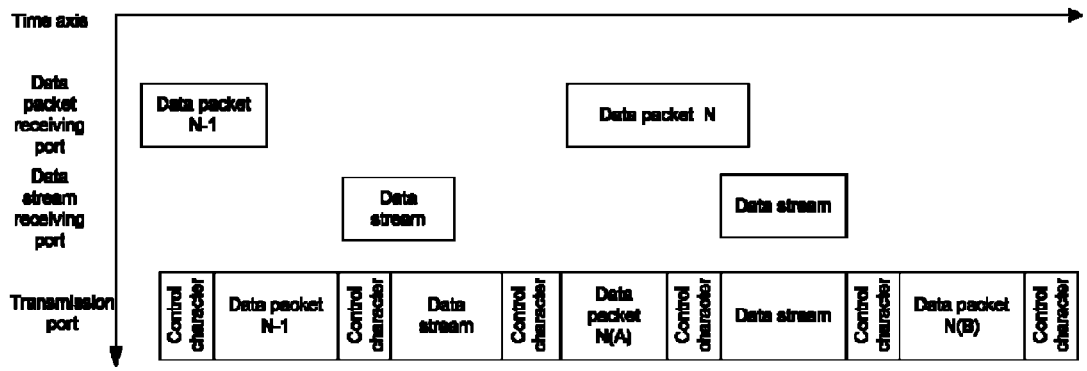
FIG. 4 is a schematic diagram of formats of a data stream and a data packet in data transmission upon establishment of a link according to an embodiment of the disclosure.

FIG. 4 is a schematic diagram of formats of a data stream and a data packet in data transmission upon establishment of a link according to an embodiment of the disclosure. As shown in FIG. 4, by setting an arbitration mechanism, in transmission of a data packet and a data stream, the data stream may be transmitted by temporarily interrupting transmission of the data packet; if transmission of the data packet is interrupted, information indicative of interruption of the data packet is added in the control character. To be specific, after the data in two data channels of the data stream and the data packet is packetized, an arbitrator is set to process requests from the two channels. The data stream imposes higher requirements on effectiveness. In the arbitrator, the data stream enjoys a high priority and the data packet enjoys a low priority. Transmission of the data packet may be interrupted by a request for transmitting the data stream.

After the data passes through the arbitrator, in the transmission of the data stream, if the data packet is not completely transmitted, the arbitrator cannot receive a request for transmitting other data. To be specific, transmission of the data stream may not be interrupted by the data packet until the data stream is completely transmitted. Upon completion of transmission of the data stream, the arbitrator may receive a next request, wherein the request may be a data stream or a data packet. If two requests are sent simultaneously, the request for transmitting the data stream is received according to preferential principles.

In the transmission of the data packet, if a request for transmitting the data stream is sent to the arbitrator, the arbitrator may receive the request for transmitting the data stream and meanwhile interrupts transmission of the data packet, and insert a control character between the interrupted data packet and the data stream, indicating that the data packet is not completely transmitted due to interruption, and instructing subsequent transmission of a data stream. Upon completion of transmission of the data stream, the data packet that is not completely transmitted is continuously transmitted. Upon completion of packetization and conflict processing, a sending end sends the data to the opposite end via a connector.

A receiving mechanism is set at the receiving end, and the data packet and the data stream are parsed by identifying the control character. That is, a packet parsing module is set at the receiving end. The packet parsing module receives the packetized data, identifies a transmission type of the data, and parses out the data stream and the data packet.

If transmission of the data packet is interrupted, the parsed data packet may restore the data in the interrupted data packet into a complete data packet, and restore start and end mark of the data packet. That is, if the parsed data packet is an interrupted data packet, such interrupted and split data packets are collected, and then these data packets are combined to restore the complete data packet.

Figure 5:
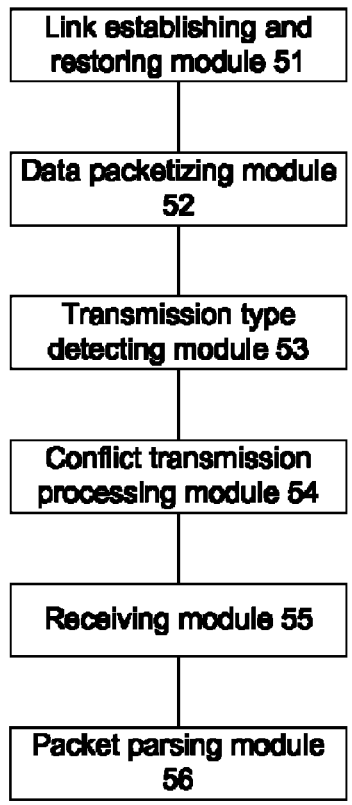
FIG. 5 is a schematic structural diagram of a data stream and data packet transmission device according to an embodiment of the disclosure.

FIG. 5 is a schematic structural diagram of a data stream and data packet transmission device according to an embodiment of the disclosure. As shown in FIG. 5, the device includes: a link establishing and restoring module 51, a data packetizing module 52, a transmission type detecting module 53, a conflict transmission processing module 54, a receiving module 55, and a packet parsing module 56.

The link establishing and restoring module 51 is configured to establish, by sending a control character for establishing an interface link connection to an opposite end, the interface link connection with the opposite end.

Herein, the link establishing and restoring module implements the function of establishing a link between the two ends, and provides a link restoring function in case of link instability.

The data packetizing module 52 is configured to packetize a data stream or a data packet, and to insert a control character for identifying a data transmission type.

Herein, the data packetizing module implements the packetization function of the data packet or the data stream, and inserts a corresponding control character.

The transmission type detecting module 53 is configured to detect whether data to be transmitted is the data stream or the data packet.

The conflict transmission processing module 54 is configured: when it is detected that the data stream and the data packet exist simultaneously, to preferentially transmit the data stream; and upon completion of transmission of the data stream, to transmit the data packet.

Herein, to improve the real-time performance of transmission of the data stream, and to implement preferential transmission of the data stream in the transmission of the data packet, the data stream is transmitted in a way of interrupting transmission of the data packet in the transmission of the data packet.

The receiving module 55 is configured to receive data from the opposite end.

The packet parsing module 56 is configured to identity, according to the control character in the received data, the transmission type of the received data, and to parse out the data stream or the data packet.

Herein, the packet parsing module parses, at the receiving end, the data stream and the data packet via the control character.

In conclusion, the embodiments of the disclosure achieve the following technical effects:
1. According to the embodiments of the disclosure, when the data stream and the data packet exist simultaneously, high efficiency and stable transmission of the data stream may be achieved with no need of extra external time for scheduling operations.
2. According to the embodiments of the disclosure, when transmission of the data stream is in conflict with transmission of the data packet, the solution of interrupting transmission of the data packet to ensure preferential transmission of the data stream, which greatly enhances effectiveness of the data stream.
3. According to the embodiments of the disclosure, the interface transmission efficiency may be effectively improved by using the control character.

The link establishing and restoring module 51, the data packetizing module 52, the transmission type detecting module 53, the conflict transmission processing module 54, the receiving module 55, and the packet parsing module 56 in the data stream and data packet transmission device according to the embodiments of the disclosure may all be implemented by a server or a process of a terminal, or may also be implemented by a specific logic circuit. For example, in practice, the processor may be a Central Processing Unit (CPU), a Micro Processing Unit (MPU), a Digital Signal Processor (DSP), or a Field Programmable Gate Array (FPGA), or the like.

Described above are only preferred embodiments of the disclosure, which are not intended to limit the protection scope of the disclosure. Any equivalent structure or equivalent process variation made based on the specification and drawings of the disclosure, which is directly or indirectly applied in other related technical fields, fall within the scope of the disclosure.

INDUSTRIAL APPLICABILITY

According to the embodiments of the disclosure, it is detected whether data to be transmitted is a data stream or a data packet; when it is detected that the data stream and the data packet exist simultaneously, the data stream is preferentially transmitted; upon completion of transmission of the data stream, the data packet is transmitted. This ensures low latency and high stability of transmission of the data stream. Further, according to the embodiments of the disclosure, real-time transmission of the data stream is implemented by interrupting transmission of the data packet. Upon completion of transmission of the data stream, transmission of the data packet is restored. This implements high efficiency transmission of the data stream, and meanwhile improves throughput of data transmission on the entire interface.

What is claimed is:
1. A data stream and data packet transmission method, comprising:
   detecting whether data to be transmitted is a data stream whose transmission is not interrupted or stopped or a data packet according to a control character which identifies a data transmission type;

when it is detected that the data stream and the data packet need to be simultaneously transmitted through one interface, preferentially transmitting the data stream; and upon completion of transmission of the data stream, then transmitting the data packet;

wherein, the step of preferentially transmitting the data stream comprises:

when transmitting the data stream, after finishing transmission of the data stream, transmitting the data packet;

when transmitting the data packet, stopping transmitting the data packet once the data stream needs to be transmitted, and inserting the control character which indicates interruption of transmission of the data packet into the data packet whose transmission is interrupted; and then transmitting the data stream needs to be transmitted, until finishing transmission of the data stream needs to be transmitted, transmitting the data packet whose transmission is interrupted;

wherein the control character comprises:

a delimiter, configured to distinguish whether data is the control character or data;

a command type, configured to indicate a current link state; and state data, configured to indicate information as a packet type of the data to be transmitted and whether the data packet is interrupted.

2. The method according to claim 1, further comprising: establishing, by sending a control character for establishing an interface link connection to an opposite end, the interface link connection with the opposite end.

3. The method according to claim 1, further comprising: packetizing the data stream or the data packet, inserting the control character for identifying a data transmission type, and sending the packetized data stream or data packet to an opposite end.

4. The method according to claim 1, further comprising: receiving data from the opposite end; and identifying, according to the control character in the data from the opposite end, the transmission type of the received data, and parsing out the data stream or the data packet.

5. A data stream and data packet transmission device, comprising:

a transmission type detecting module, configured to detect whether data to be transmitted is a data stream whose transmission is not interrupted or stopped or a data packet according to a control character which identifies a data transmission type; and a conflict transmission processing module, configured: when it is detected that the data stream and the data packet need to be simultaneously transmitted through one interface, to preferentially transmit the data stream; and upon completion of transmission of the data stream, to transmit the data packet;

wherein the conflict transmission processing module is further configured to:

when transmitting the data stream, after finishing transmission of the data stream, transmit the data packet;

when transmitting the data packet, stop transmitting the data packet once the data stream needs to be transmitted, and insert the control character which indicates interruption of transmission of the data packet into the data packet whose transmission is interrupted; and then transmit the data stream needs to be transmitted, until finishing transmission of the data stream needs to be transmitted, transmit the data packet whose transmission is interrupted;

wherein the control character comprises:

a delimiter, configured to distinguish whether data is the control character or data;

a command type, configured to indicate a current link state; and state data, configured to indicate information as a packet type of the data to be transmitted and whether the data packet is interrupted.

6. The device according to claim 5, further comprising:
a link establishing and restoring module, configured to establish, by sending a control character for establishing an interface link connection to an opposite end, the interface link connection with the opposite end.

7. The device according to claim 5, further comprising:
a data packetizing module, configured to packetize the data stream or the data packet, and to insert the control character for identifying a data transmission type.

8. The device according to claim 7, further comprising:
a receiving module, configured to receive data from an opposite end; and a packet parsing module, configured to identity, according to the control character in the data from the opposite end, the transmission type of the received data, and to parse out the data stream or the data packet.

9. The method according to claim 2, further comprising: packetizing the data stream or the data packet, inserting a control character for identifying the data transmission type, and sending the packetized data stream or data packet to an opposite end.

10. The device according to claim 6, further comprising:
a data packetizing module, configured to packetize the data stream or the data packet, and to insert the control character for identifying a data transmission type.

11. The device according to claim 10, further comprising:
a receiving module, configured to receive data from an opposite end; and a packet parsing module, configured to identity, according to the control character in the data from the opposite end, the transmission type of the received data, and to parse out the data stream or the data packet.

* * * * *